United States Patent
Bergano

(10) Patent No.: US 11,924,200 B1
(45) Date of Patent: Mar. 5, 2024

(54) APPARATUS AND METHOD FOR CLASSIFYING A USER TO AN ELECTRONIC AUTHENTICATION CARD

(71) Applicant: Aesthetics Card, Inc., Pasadena, CA (US)

(72) Inventor: John Bergano, Pasadena, CA (US)

(73) Assignee: Aesthetics Card, Inc.

( * ) Notice: Subject to any disclaimer, the term of this patent is extended or adjusted under 35 U.S.C. 154(b) by 0 days.

(21) Appl. No.: 17/982,186

(22) Filed: Nov. 7, 2022

(51) Int. Cl.
*H04L 9/40* (2022.01)
*G06N 20/00* (2019.01)
*G06Q 40/03* (2023.01)
*H04L 9/32* (2006.01)

(52) U.S. Cl.
CPC ......... *H04L 63/0853* (2013.01); *G06N 20/00* (2019.01); *G06Q 40/03* (2023.01); *H04L 9/3247* (2013.01)

(58) Field of Classification Search
CPC ..... H04L 63/0853; H04L 9/324; G06N 20/00; G06Q 40/03
See application file for complete search history.

(56) References Cited

U.S. PATENT DOCUMENTS

| | | | | |
|---|---|---|---|---|
| 6,430,305 | B1 * | 8/2002 | Decker | G06F 18/254 382/116 |
| 7,925,578 | B1 * | 4/2011 | Hong | G06Q 40/00 705/38 |
| 10,685,351 | B1 * | 6/2020 | Sorbello | G06F 16/9535 |
| 11,315,179 | B1 | 4/2022 | Rehder | |
| 11,444,893 | B1 * | 9/2022 | Kalluri | H04L 51/02 |
| 11,615,170 | B1 * | 3/2023 | Guerra | G06F 21/62 726/28 |
| 2003/0074325 | A1 * | 4/2003 | Ryan, Jr. | G07B 17/00024 705/60 |
| 2003/0139961 | A1 * | 7/2003 | Arguello | G06Q 10/04 705/7.14 |
| 2008/0126124 | A1 * | 5/2008 | Schechter | G16H 50/30 705/2 |
| 2014/0379381 | A1 * | 12/2014 | Turkanis | G16Z 99/00 705/3 |
| 2015/0220999 | A1 | 8/2015 | Thornton | |
| 2016/0191532 | A1 * | 6/2016 | Seiver | H04L 63/1433 726/4 |
| 2019/0095898 | A1 * | 3/2019 | Bhatia | G06Q 20/227 |
| 2019/0206105 | A1 * | 7/2019 | Martin | G06T 11/60 |
| 2020/0074546 | A1 * | 3/2020 | Coulter | G06Q 20/108 |

(Continued)

FOREIGN PATENT DOCUMENTS

WO 2021/207719 A1 10/2021

*Primary Examiner* — Ghodrat Jamshidi
(74) *Attorney, Agent, or Firm* — Caldwell Intellectual Property Law

(57) ABSTRACT

An apparatus for classifying a user to an electronic authentication card, the apparatus comprising at least a processor and a memory communicatively connected to the processor, the memory containing instructions configuring the at least a processor to receive user data comprising a transaction history, identify a plurality of authentication card parameters as a function of user input, determine a plurality of access rights as a function of user data and the plurality of authentication card parameters and generate an access pairing data structure linking the plurality of access rights to the authentication card.

18 Claims, 9 Drawing Sheets

(56) References Cited

U.S. PATENT DOCUMENTS

| | | | |
|---|---|---|---|
| 2020/0076612 A1* | 3/2020 | Adluri | H04L 9/3247 |
| 2020/0076813 A1* | 3/2020 | Felice-Steele | H04L 63/0861 |
| 2020/0126126 A1* | 4/2020 | Briancon | G06N 5/01 |
| 2020/0134605 A1* | 4/2020 | Grant | G06Q 30/0215 |
| 2021/0014065 A1* | 1/2021 | Gourisetti | H04L 9/3236 |
| 2021/0027357 A1 | 1/2021 | Bonfigli | |
| 2021/0125179 A1* | 4/2021 | Mach | G06Q 20/401 |
| 2021/0398109 A1* | 12/2021 | Huber, Jr. | G06N 3/04 |
| 2022/0027677 A1* | 1/2022 | Kakizaki | G06F 18/28 |
| 2022/0027983 A1* | 1/2022 | Ben David | G06Q 40/03 |
| 2022/0215465 A1* | 7/2022 | Mitchko | G06Q 20/4037 |
| 2022/0308714 A1* | 9/2022 | Murata | G06Q 10/103 |
| 2023/0012110 A1* | 1/2023 | Fish | G06Q 30/0232 |
| 2023/0139364 A1* | 5/2023 | Vemulapally | G06N 20/00 705/35 |

* cited by examiner

APPARATUS AND METHOD FOR CLASSIFYING A USER TO AN ELECTRONIC AUTHENTICATION CARD

FIELD OF THE INVENTION

The present invention generally relates to the field of authentication cards. In particular, the present invention is directed to an apparatus and method for classifying a user to an electronic authentication card in the healthcare field.

BACKGROUND

There are currently over 40,000 medical practices nationally. Startup and established medical practices lack efficient and tailored financial products to meet their growing needs. Institutional banks have rigid underwriting criteria and there is a lack of credit cards tailored specifically to the medical field to solve this issue.

SUMMARY OF THE DISCLOSURE

In an aspect, an apparatus for classifying a user to an electronic authentication card, the apparatus comprising at least a processor and a memory communicatively connected to the processor, the memory containing instructions configuring the at least a processor to receive user data comprising a transaction history, identify a plurality of authentication card parameters as a function of user input, determine a plurality of access rights as a function of user data and the plurality of authentication card parameters and generate an access pairing data structure linking the plurality of access rights to the authentication card.

In another aspect, a method for classifying a user to an electronic authentication card, receiving, by at the least the processor, user data comprising a transaction history, identifying, by the at least the processor, a plurality of authentication card parameters as a function of user input, determining a plurality of access rights as a function of user data and the plurality of authentication card parameters and generating an access pairing data structure linking the plurality of access rights to the authentication card.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
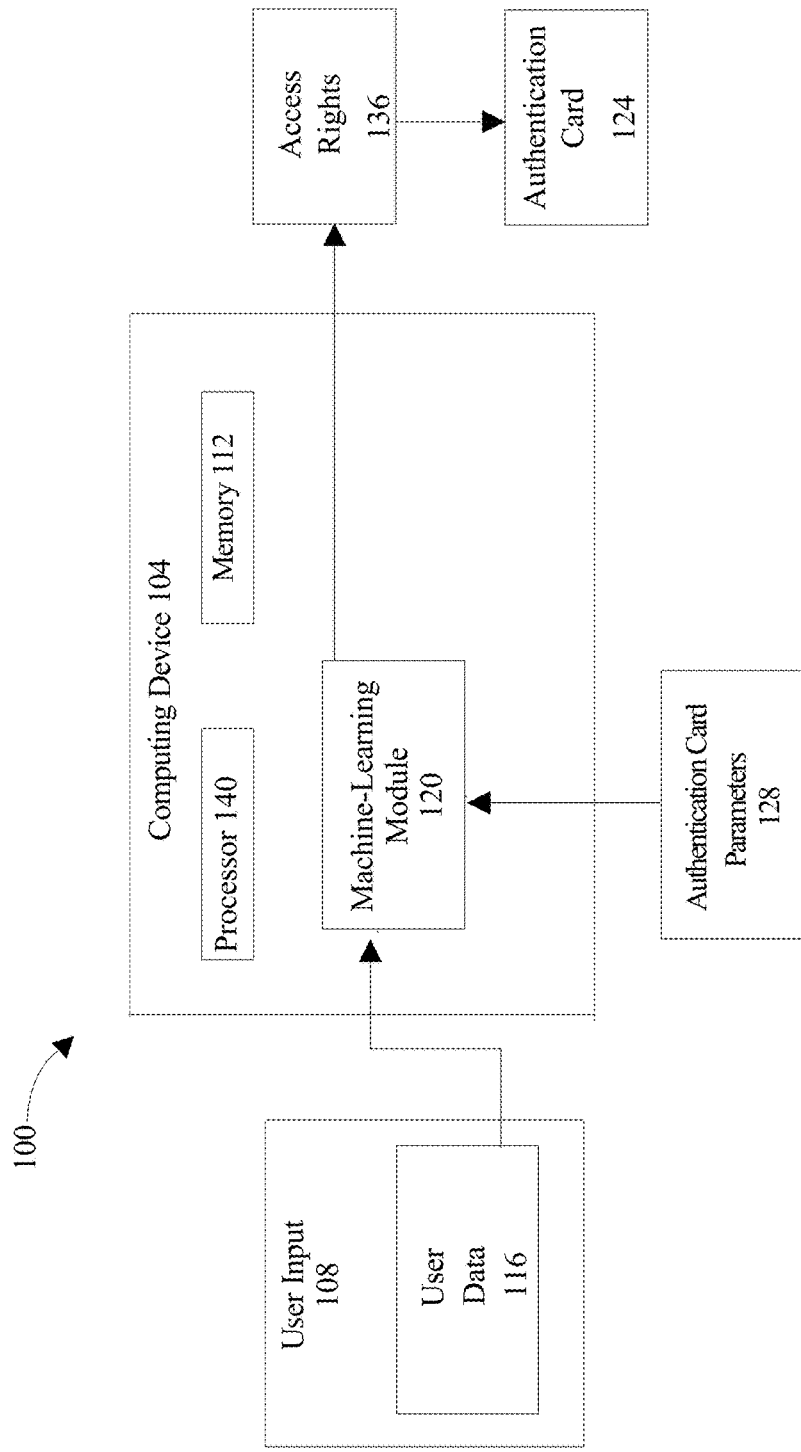
FIG. 1 is a block diagram of an exemplary embodiment of an apparatus for classifying a user to an electronic authentication card.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods that classify a user to an electronic authentication card in the healthcare field. Aspects of the present disclosure may consider user's financial history, time in business, and the like to generate a tailored card with various access rights.

Aspects of the present disclosure can be used to help users in the healthcare field by matching them with a tailored authentication card for their medical business needs. The authentication card offers a working capital solution for those who do not qualify for other authentication cards or for medical practices which require additional capital for day-to-day operation or smaller purchases. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamperproofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with the signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for classifying a user to an electronic authentication card 124 in the healthcare field is illustrated. "Authentication card" as used in this disclosure is defined as a card that authenticates its bearer as having certain access rights, for example, the right to access and spend funds associated with the card. For example, an authentication card may consist of a credit card, bank card, affinity card and the like. Apparatus 100 may include, be included in, and/or be a computing device 104. Computing device 104 may be designed and/or configured to perform any method, method step, or sequence of method steps in any embodiment described in this disclosure, in any order and with any degree of repetition. For instance, a computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Apparatus 100 also includes a processor 140. Processor 140 may include any processor incorporated in any computing device as described in this disclosure, including without limitation a microcontroller, microprocessor, digital signal processor (DSP) and/or system on a chip (SoC) as described in this disclosure. Processor and/or computing device may include, be included in, and/or communicate with a mobile device such as a mobile telephone or smartphone. A computing device incorporating processor 140 may include a single computing device operating independently, or may include two or more computing device operating in concert, in parallel, sequentially or the like; two or more computing devices may be included together in a single computing device or in two or more computing devices. Processor 140 and/or computing device may interface or communicate with one or more additional devices as described below in further detail via a network interface device. Network interface device may be utilized for connecting processor 140 and/or computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A computing device including processor 140 may include but is not limited to, for example, a computing device or cluster of computing devices in a first location and a second computing device or cluster of computing devices in a second location. A computing device including processor 140 may include one or more computing devices dedicated to data storage, security, distribution of traffic for load balancing, and the like. A computing device including processor 140 may distribute one or more computing tasks as described below across a plurality of computing devices of computing device, which may operate in parallel, in series, redundantly, or in any other manner used for distribution of tasks or memory between computing devices. A computing device including processor 140 may be implemented using a "shared nothing" architecture in which data is cached at the worker, in an embodiment, this may enable scalability of apparatus 100 and/or computing device.

With continued reference to FIG. 1, processor 140 and/or computing device may be designed and/or configured to perform any method, method step, or sequence of method steps in any embodiment described in this disclosure, in any order and with any degree of repetition. For instance, processor 140 and/or computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 140 and/or computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, apparatus 100 includes a memory 112, which may be implemented in any manner suitable for a primary and/or secondary memory described in this disclosure. Memory 112 may include instructions configuring processor 140 to perform various tasks. In some embodiments, apparatus 100 may include a computing device 104, where computing device includes processor 140 and/or memory 112. Memory 112 may be communicatively connected to processor 140. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 is configured to receive a user input 108. In some embodiments, apparatus 100 may receive user input 108 from one or more external computing devices. An "external computing device" as used in this disclosure is defined as any a computing device that is distinct from apparatus 100 and/or computing device. An external computing device may include any computing device as described in this disclosure. A "user input", as used in this disclosure, is a form of data entry received from an individual and/or group of individuals, such as an individual and/or group of individuals that is using and/or interacting with apparatus 100. User input 108 may include, but is not limited to, user data 116. "User data" as used in this disclosure is defined as information related to establishing a financial history. User data 116 may include a transaction history. "Transaction history" as used in this disclosure is defined as a data structure that includes at least a datum describing at least a previous transaction and transaction history may include a plurality of data describing a plurality of transactions. For example, transaction history may include a running record of all financial transactions logged in a bank, authentication, charge/credit card or investment statement. In an embodiment transaction history may include a historical credit or authentication card statement. An "authentication card statement" as used in this disclosure is defined as a transaction history containing one or more data representing authentication card transactions, such as all authentication card transactions and bank statements over a billing cycle, a month, or the like. A historical authentication card statement may include past authentication card statements going back for months or years. Transaction history may also include at least an immutable element and a cryptographically signed data element. In an embodiment, a digital signature may be evaluated and authenticated for these elements by, for example, authenticating against hashes in order to determine if any tampering has occurred and by, for example, authenticating a posting, sub listing, or whole immutable sequential listing as described above. In another embodiment, transactional history may include a bank statement. A "bank statement" as used in this disclosure is defined as a document that is issued by a bank once a month to its customer, listing the transactions impacting a bank account. A historical bank statement may include past bank statements going back for months or years.

Still referring to FIG. 1, user data 116 may include occupation information. "Occupation information" as used in this disclosure is defined as information related to a user's job or profession. For example, occupation information may include the user's job title, length of time employed, industry of employment and the like. User data may be related to a person and contain personal information. For example, full legal name, social security number, employment identification number and/or individual taxpayer identification number, mailing address, email address, gross annual income, employment status, transactional data, credit report, credit history, phone number, housing costs, account details (i.e., number of savings and checking accounts), assets (i.e., savings, investment, and property), credit cards, debts, loans, car payments, citizenship, residential address and the like. In some embodiments, user data may be related to a business and contain business information. For example, employer information, transactional data of a business, number of years business has been established, number of deposits per month in a business bank account, monthly revenue, average daily bank balance, credit history/report of a business, business registration details, government activity summary, company information (i.e., employees, sales, ownership, and subsidiaries), data relating to business operations, industry classification and data, public filings (i.e., liens, judgments, and UCC filings), past payment history and collections related to a business, number of accounts (i.e., credit, checking, savings), account details, and the like. Computing device 104 may obtain user data 116 from a survey, form, questionnaire and the like.

Still referring to FIG. 1, in some embodiments, computing device 104 may be configured to monitor aspects of user data 116 over a period of time. As a function of receiving user data, computing device, with access granted by a user, may monitor the financial transactions of a person or a business over a period of time. In some embodiments, computing device 104 may perform a "Know Your Customer" (KYC) check. A "Know Your Customer check," as used in this disclosure is defined as a financial guideline to verify the identity, suitability, and risks involved with maintaining a business relationship. There are various steps that may be performed in order to achieve KYC compliance. First, a user's identity must be unequivocally established, this may be accomplished by collecting user's personal information, such as name, date of birth, email, social security number, driver's license number, current credit card numbers and the like. This information may be inputted by the user via a form, survey, questionnaire and the like. Next, the user's identity document must be uploaded, this may consist of a passport, ID card, driver's license, debit or credit card and the like. Then, the information entered by the user is matched to the user's identity document, this step ensures the user has provided the correct information, optical character recognition may be utilized. "Optical character recognition" as used in this disclosure is defined as the electronic or mechanical conversion of images of typed, handwritten or printed text into machine-encoded text, whether from a scanned document, a photo of a document, a scene-photo or from subtitle text superimposed on an image. Then, if both the user input information and the user's identity document match, the user is verified. If the user input information and the user's identity document do not match, the user in not verified. KYC guidelines may prevent businesses, such as credit card companies, banks, and the like from being used by criminal elements for money laundering. These guidelines may also enable businesses to better understand their customers and their financial dealings. A KYC check may include a customer acceptance policy, customer identification procedures, monitoring of transactions, and risk management. A user involved in a KYC may include a person or entity that maintains an account or has a business relationship with the reporting entity; one on whose behalf the account is maintained (i.e. the beneficial owner); beneficiaries of transactions conducted by professional intermediaries such as stockbrokers, chartered accountants, or solicitors, as permitted under the law; or any person or entity connected with a financial transaction that can pose significant reputational or other risks to the bank, for example, a wire transfer or issue of a high-value demand draft as a single transaction.

In some embodiments, computing device may perform a "Know Your Business" (KYB) check on a business to identify the veracity of businesses and in extended due diligence monitor their financial transactions over time. A "Know Your Business Check," as used in this disclosure, is a guideline which seeks to identify the veracity of businesses and in extended due diligence monitor their financial transactions over time. There are various steps that must be performed in order to achieve KYB compliance. First, a business's identity must be unequivocally established, this may be accomplished by collecting various information about the business such as business data, business documents such as business registrations, certificates of incorporation and the like. This information may be inputted by user via a form, survey, questionnaire and the like. Next, the business documents must be uploaded, this may consist of a business registration, certificate of incorporation, government-issued licenses, partnership agreements and the like. Then, the business information entered by the user is matched to the business documents, this step ensures the user has provided the correct information, optical character recognition may be utilized. "Optical character recognition" as used in this disclosure is defined as the electronic or mechanical conversion of images of typed, handwritten, or printed text into machine-encoded text, whether from a scanned document, a photo of a document, a scene-photo or from subtitle text superimposed on an image. Then, if both the business input information and the business document(s) match, the business is verified. If the business input information and the business document(s) do not match, the business in not verified. The matching process may include the implementation of a classifier and/or a machine-learning process/module that determines a similarity score. A "classifier," as used in this disclosure is a machine-learning model, such as a mathematical model, neural net, or program generated by a machine learning algorithm known as a "classification algorithm," and described in further detail below. Training data may include a database of business data and validation data. Machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language. In one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure. For example, training data inputs may be business data and outputs may be validation data and/or a determination of a match or not. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Data may include previous outputs such that the retrained machine-learning module 120 iteratively produces outputs, thus creating a feedback loop. For example, an input may include the business data and an output may include a determination of a match to indicate a business verification. In an embodiment, digital signatures or other cryptographic techniques may be utilized to verify customers and/or businesses.

The KYB check may include verification of the business registration, business license updates and the direct or indirect owner of the business or Ultimate Beneficial Owner (UBO). An "ultimate beneficial owner" as used in this disclosure is defined as the natural person who ultimately owns or manages a company, this person does not have to have to be known directly as the owner. A KYB check may be a company's Anti-Money Laundering compliance verification. The KYB process requires firms to collect, analyze, and manage vast amount of data on the businesses that they have relationships with. In an embodiment, determining the identity of customers and/or businesses may include device fingerprinting utilizing device fingerprint data. "Device fingerprint data," as used in this disclosure, is data used to determine a probable identity of a device as a function of at least a field parameter of a communication from the device. At least a field parameter may be any specific value and/or user thereof for any field regulating exchange of data according to protocols for electronic communication. As a non-limiting example, at least a field may include a "settings" parameter such as SETTINGS_HEADER_TABLE_SIZE, SETTINGS_ENABLE_PUSH, SETTINGS_MAX_CONCURRENT_STREAMS, SETTINGS_INITIAL_WINDOW_SIZE, SETTINGS_MAX_FRAME_SIZE, SETTINGS_MAX_HEADER_LIST_SIZE, WINDOW_UPDATE, WINDOW_UPDATE, WINDOW_UPDATE, SETTINGS_INITIAL_WINDOW_SIZE, PRIORITY, and/or similar frames or fields in HTTP/2 or other versions of HTTP or other communication protocols. Additional fields that may be used may include browser settings such as "user-agent" header of browser, "accept-language" header, "session_age" representing a number of seconds from time of creation of session to time of a current transaction or communication, "session_id," 'transaction_id," and the like. Determining the identity of the customer and/or business may include fingerprinting the customer and/or business as a function of at least a machine operation parameter. At least a machine operation parameter, as used herein, may include a parameter describing one or more metrics or parameters of performance for a device and/or incorporated or attached components; at least a machine operation parameter may include, without limitation, clock speed, monitor refresh rate, hardware or software versions of a browser running on a device, or the like, or any other parameters of machine control or action available in at least a communication.

Verification of customer and/or business may include utilizing location datum using internet protocol (IP) geolocation. "IP geolocation", as used in this disclosure, is a mapping of IP addresses and/or media access control (MAC) addresses to particular and/or approximate geographical locations; computing device 104 may look up the particular and/or approximate geographical location of the customer and/or business upon receiving an IP and/or MAC address of the customer and/or business and/or of a modem, server, wireless communication hub, and/or other device. Alternatively or additionally, computing device 104 may determine an approximate location of the customer and/or business by measuring network communication latency; for instance, if responses from remote device are received within a threshold amount of time, customer and/or business may be determined to be within some maximal radius from computing device 104, and/or from a modem, server, wireless communication hub, and/or other device. Computing device 104 may alternatively or additionally store and/or look up geographical locations associated with device fingerprint data, including fingerprint of customer and/or business, intermediary devices, or the like, where "intermediary devices" are defined as any devices, such as a modem, server, wireless communication hub, and/or other device. Intermediary devices may alternatively or additionally provide their geographic data, which may be used in turn to estimate a location of customer and/or business; for instance, network communication latency may be used to estimate a distance from intermediary device to customer and/or business, and/or intermediary device may communicate with customer and/or business using local types of transmission, for instance if intermediary device is a wi-fi hub, cell tower, or the like. Each of device fingerprinting, IP geolocation and network latency may be inputted into the classifier.

Referring to FIG. 1, user input 108 may include, but is not limited to text input, engagement with icons of a graphical user interface (GUI), and the like. Text input may include, without limitation, entry of characters, words, strings, symbols, and the like. In some embodiments, user input 108 may include one or more interactions with one or more elements of a graphical user interface (GUI). A "graphical user interface" as used in this disclosure is an interface including set of one or more pictorial and/or graphical icons corresponding to one or more computer actions. GUI may be configured to receive user input 108. GUI may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance, and without limitation, an event handler may be programmed to generate a pop-up window if a user double clicks on a specific icon. User input 108 may include, a manipulation of computer icons, such as, but not limited to, clicking, selecting, dragging and dropping, scrolling, and the like. In some embodiments, user input 108 may include an entry of characters and/or symbols in a user input field. A "user input field" as used in this disclosure is a portion of graphical user interface configured to receive data from an individual. A user input field may include, but is not limited to, text boxes, search fields, filtering fields, and the like. In some embodiments, user input 108 may include touch input. Touch input may include, but is not limited to, single taps, double taps, triple taps, long presses, swiping gestures, and the like. In some embodiments, GUI may be displayed on, without limitation, monitors, smartphones, tablets, vehicle displays, and the like. Vehicle displays may include, without limitation, monitors and/or systems in a vehicle such as multimedia centers, digital cockpits, entertainment systems, and the like. One of ordinary skill in the art upon reading this disclosure will appreciate the various ways a user may interact with graphical user interface.

Still referring to FIG. 1, apparatus 100 may include a machine-learning module 120. Machine learning module 120 may be supervised and may be trained with training data. Apparatus 100 may identify a plurality of authentication card parameters 128 as a function of user input 108. "Authentication card parameters" as used in this disclosure is defined as qualitative and quantitative measures relating to authentication card characteristics, for example maximum spending limits, interest rate, business metrics, annual fees, annual percentage rate (APR), credit score and the like. The computing device 104 may obtain the authentication card parameters 128 from user data input, a governmental database, a private database and the like. In an embodiment, a plurality of authentication card parameters may include an activity threshold parameter. "Activity threshold parameter" as used in this disclosure is defined as establishing an upper or lower limit on a numerical parameter associated with an access right, this may include a maximum spending limit. Training data may include a plurality of authentication card parameters 128. Machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language. In one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Data may include previous outputs such that machine-learning module 120 iteratively produces outputs, thus creating a feedback loop. For example, training data may include inputs including user data 116 and optionally authentication card parameters 128 correlated to outputs including access rights 136. "Access rights" as used in this disclosure are defined as rights that allow access to the transaction assets, for example, various perks and rewards which may be earned when using an authentication card. For example, an authentication card may include service and protection consisting of purchase protection, extended warranty protection, cell phone protection, fraud alerts, auto rental collision damage waiver, travel and emergency assistance services and the like. An authentication card point reward may be earned for each dollar spent on the authentication card, the point rewards may be redeemed for merchandise, gift cards, travel, cash and the like. Access rights 136 may include various authentication card rewards/perks such as, 1% cash back on all purchases, 2-5% cashback with select partners, statement credits, 90 day 0% interest promotion on eligible transactions, access to exclusive offers and the like. For example, potential cardholder may choose one statement transaction of $2,000 or more for the 90 day, 0% interest promotion wherein installment payments are drafted via ACH (Automated Clearing House) from a linked bank account at 30, 60 and 90 days. Access rights 136 may also include partnerships for vendors whose products require unique financing and lower costs of goods through volume purchases and the like.

Continuing to reference FIG. 1, processor 140 may be configured to generate an access pairing data structure linking the plurality of access rights to the authentication card 124. "Data structure" as used in this disclosure is defined as an electronic record that links the authentication card to the funds. In an embodiment, the above may be posted to an immutable sequential listing. The access pairing data structure may further include a cryptographically signed data element. "Cryptographically signed data element" as used in this disclosure is defined as an element of data that is digitally signed, for example, this could be a transaction in an immutable sequential listing.

Continuing to reference FIG. 1, processor 140 may be configured to generate access rights 136 using a machine-learning module 120, as a function of the user data 116 and authentication card parameters 128. "Authentication card parameters" as used in this disclosure are defined as qualitative and quantitative measures relating to authentication card characteristics, for example maximum spending limits, interest rate, business metrics, annual fees, annual percentage rate (APR), credit score and the like. The computing device 104 may obtain the authentication card parameters from user data input, a governmental database, a private database and the like. The machine-learning model 120 and/or software may provide a comprehensive review of the user data 116 input against authentication card parameters 128 to output access rights 136. Access rights 136 may include bonuses. "Bonuses" as used in this disclosure are defined as a type of incentive earning through making purchases in select categories. For example, points can be earned through a bonus promotion or by making purchases using the charge card in certain categories such as dining, travel, gas and the like. For example, authentication card 124 may offer the user unlimited 5% cash back on dining at specified restaurants, receiving airlines miles after spending a certain amount on purchases within 3 months on the authentication card, receiving 5% cash back on gas purchases with the authentication card and the like. Access rights 136 may also include aesthetic specific access rights. "Aesthetic specific" as used in this disclosure is defined as an access right geared to the aesthetic specialty. "Aesthetics" as used in this disclosure is defined as the artistic, beauty-driven, specialty of cosmetic physicians and other licensed medical professional who devote many hours of training to their craft, utilizing non-surgical and non-invasive modalities in an effort to deliver safe and efficacious beauty enhancements. The aesthetics industry is complemented by surgical cosmetic procedures, dermatological care, esthetician services and physical office-dispensed skincare. For example, aesthetic specific access rights may include earning points with every purchase and the ability to redeem points to utilize on products and/or treatments at selected aesthetics locations, such as a medical spa. Access rights 136 may also include partnerships for vendors whose products require unique financing and lower costs of goods through volume purchases and the like.

In an embodiment, the machine-learning model 120 may also check for updates to user data 116. The processor 140 may provide updated user data 116 if applicable. For example, the user may pay off various outstanding personal loans and therefore the user data may be updated based on this new information. The updated information may be periodical, such as monthly, daily or weekly. For example, the processor 140 may query a database for the updated data, for example when there is a drop in user credit score and the like.

Figure 2:
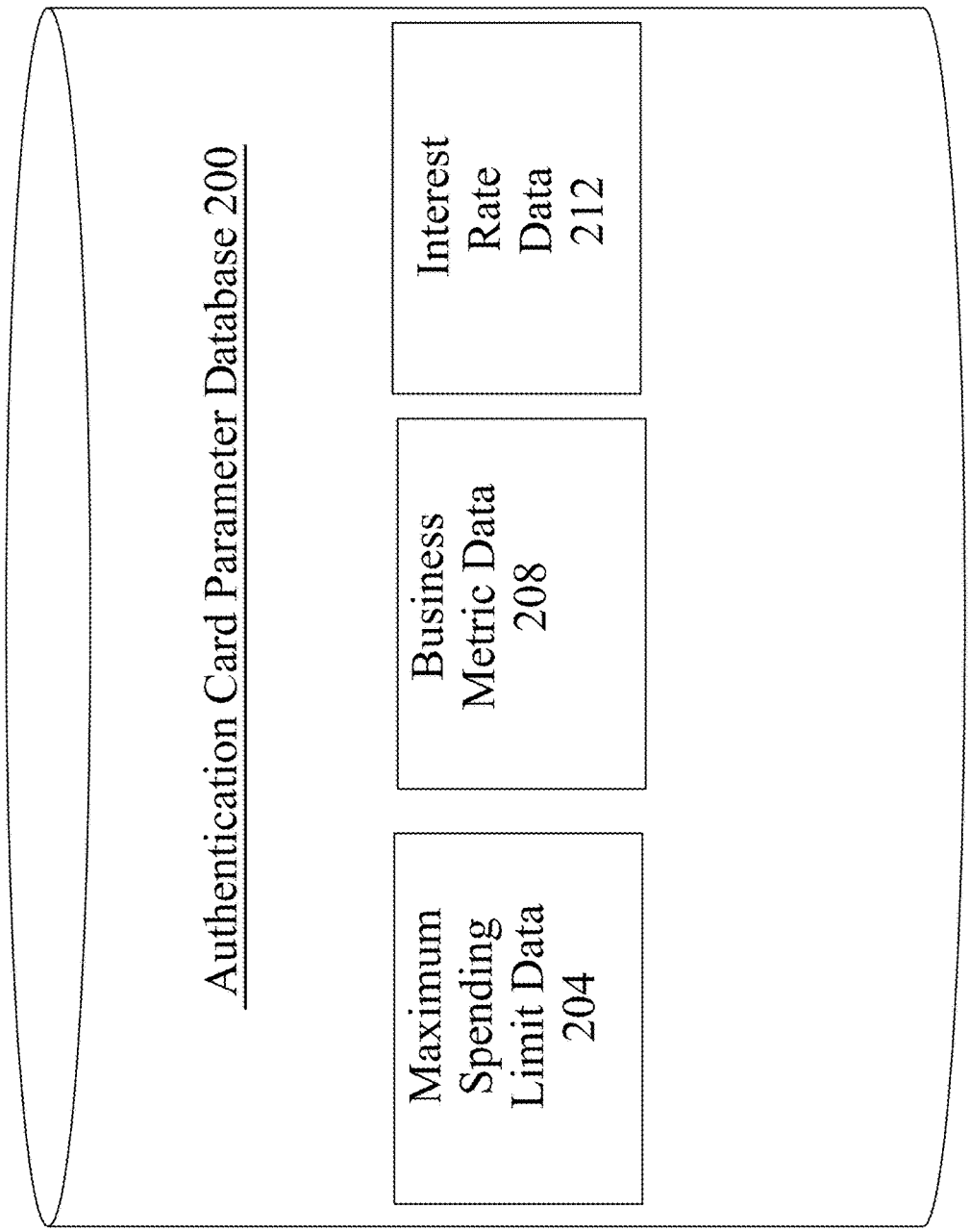
FIG. 2 is an illustration of an exemplary embodiment of a database.

Now referencing FIG. 2, an illustration of an exemplary embodiment of a database 200 is presented. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, in some embodiments, authentication card parameter database 200 may include maximum spending limit data 204. Maximum spending limit data 204 may include, without limitation, the maximum amount of money the lender will allow a consumer to spend using the authentication card, for example, if the authentication card has a limit of $50,000, it means a user can carry a balance of up to $50,000 on the card. Database 200 may also include business metric data 208. Business metric data 208 may include, without limitation, a quantifiable measure business use to track, monitor and assess the success or failure of various business processes. For example, sales revenue, net profit margin, gross profit margin and the like. Database 200 may also include interest rate data 212. Interest rate data 212 may include, without limitation, the annual percentage rate (APR) which is the price the user pays for borrowing money. Any and all determinations described above may be performed and analyzed using an optimization program.

Returning to FIG. 1, processor 140 may compute a weight associated with the authentication card parameters 128 by a minimal and/or maximal score; a mathematical function, described herein as an "objective function," may be used by processor 140 to score each possible pairing. Objective function may be based on one or more objectives as described below. In various embodiments a score of a particular authentication card parameters 128 may be based on a combination of one or more factors. Each factor may be assigned a score based on predetermined variables. In some embodiments, the assigned scores may be weighted or unweighted. Processor 140 may compute a score associated with each of the authentication card parameters 128 and the like.

Still referring to FIG. 1, apparatus 100 may generate an objective function. An "objective function" as used in this disclosure is a process of minimizing or maximizing one or more values based on a set of parameters. In some embodiments, an objective function of apparatus 100 may include an optimization criterion. For example, an optimization criterion may be a threshold. An optimization criterion may include any description of a desired value or range of values for one or more attributes; desired value or range of values may include a maximal or minimal value, a range between maximal or minimal values, or an instruction to maximize or minimize an attribute. As a non-limiting example, an optimization criterion may specify that an attribute should be within a 1% difference of an attribute criterion. An optimization criterion may alternatively request that an attribute be greater than a certain value. An optimization criterion may specify one or more tolerances for precision in a matching of attributes to improvement thresholds. An optimization criterion may specify one or more desired attribute criteria for a matching process. In an embodiment, an optimization criterion may assign weights to different attributes or values associated with attributes. One or more weights may be expressions of value to a user of a particular outcome, attribute value, or other facet of a matching process. Optimization criteria may be combined in weighted or unweighted combinations into a function reflecting an overall outcome desired by a user; function may be an attribute function to be minimized and/or maximized. A function may be defined by reference to attribute criteria constraints and/or weighted aggregation thereof as provided by apparatus 100; for instance, an attribute function combining optimization criteria may seek to minimize or maximize a function of improvement threshold matching.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score attributes as described above, calculate an output of mathematical expression using the variables, and select a pairing that produces an output having the lowest size, according to a given definition of "size," of the set of outputs representing each of plurality of candidate improvement thresholds; size may, for instance, included absolute value, numerical size, or the like. Selection of different loss functions may result in identification of different potential pairings as generating minimal outputs. Objectives represented in an objective function and/or loss function may include minimization of differences between attributes and improvement thresholds.

Optimization of objective function may include performing a greedy algorithm process. A "greedy algorithm" is defined as an algorithm that selects locally optimal choices, which may or may not generate a globally optimal solution. For instance, processor 140 may select specific parameters so that scores associated therewith are the best score.

Still referring to FIG. 1, objective function may be formulated as a linear objective function, which processor 140 may solve using a linear program such as without limitation a mixed-integer program. A "linear program," as used in this disclosure, is a program that optimizes a linear objective function, given at least a constraint, for instance, construction constraint. In various embodiments, apparatus 100 may determine a threshold that maximizes a total score subject to a parameter. A mathematical solver may be implemented to solve for the set construction and geographical constraints that maximizes scores; mathematical solver may be implemented on processor 140 and/or another device in apparatus 100, and/or may be implemented on third-party solver.

With continued reference to FIG. 1, optimizing objective function may include minimizing a loss function, where a "loss function" is an expression an output of which an optimization algorithm minimizes to generate an optimal result. As a non-limiting example, processor 140 may assign variables relating to a set of parameters, which may correspond to score components as described above, calculate an output of mathematical expression using the variables, and select a construction constraint that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referencing FIG. 1, processor 140 may be configured to provide recommendations using an asset machine-learning module, as a function of the authentication card parameters 128 and user input 108 data. Asset machine-learning module may be a classifier, as discussed below. In an embodiment, asset machine-learning module may identify a potential problem in the user data 116. For example, asset machine-learning module may identify a FICO score which is too low and may indicate that the FICO score must be 100 points higher. Asset-machine-learning module may be supervised and may be trained with training data. Training data may include a plurality of authentication card parameters 128 and user input 108 data. Machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce outputs given data provided as inputs; this is in contrast to a non-machine learning software program where the commands to be executed are determined in advance by a user and written in a programming language. In one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs Still referring to FIG. 1, in some embodiments, apparatus 100 may be configured to rank user input 108 as a function of a ranking criterion. A "ranking criterion" as used in this disclosure is a value or values that determine a priority of one or more elements. A ranking criterion may include, but is not limited to, whole numbers, percentages, decimal values, and the like. Apparatus 100 may determine a ranking criterion based on a compliance of one or more attributes of user input 108. For instance, and without limitation, apparatus 100 may rank user input 108 in order of least compliant to most compliant. In other embodiments, apparatus 100 may rank user input 108 in order of most compliant to least compliant, without limitation.

Still referring to FIG. 1, apparatus 100 may determine the threshold through generating a web index query. A "query" as used in this disclosure is a search function that returns data. Apparatus 100 may generate a query to search through databases for similar attributes. A query may include querying criteria. "Querying criteria" as used in this disclosure are parameters that constrain a search. Querying criteria may include, but is not limited to, attribute similarity, attribute category, and the like. Querying criteria may be tuned by a machine-learning model, such as a machine-learning model described below in FIG. 3.

Still referring to FIG. 1, processor 140 may engage in web searching and/or web crawling to obtain this obtain user input 108. "Web crawling" as used in this disclosure is defined as an internet bot that systematically browses the World Wide Web and is typically operated by search engines for the purposes of web indexing. Web crawling may include checking related websites and other sources of information that may indicate clues in reference to building codes, for example a query may include a web crawler function. A query may be configured to search for one or more keywords, key phrases, and the like. A keyword may be used by a query to filter potential results from a query. As a non-limiting example, a keyword may include "kinetics". A query may be configured to generate one or more key words and/or phrases as a function of user input 108. A query may give a weight to one or more attributes of user input 108. "Weights", as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicated that the weighted value makes up 20% of the total value. In some embodiments, a query may pair one or more weighted values to one or more attributes of user input 108. Weighted values may be tuned through a machine-learning model, such as any machine learning model described throughout this disclosure, without limitation. In some embodiments, a query may generate weighted values based on prior queries. In some embodiments, a query may be configured to filter out one or more "stop words" that may not convey meaning, such as "of," "a," "an," "the," or the like.

Still referring to FIG. 1, a query may include a search index. A "search index" as used in this disclosure is a data structure that is configured to compare and/or match data. A search index may be used to link two or more data elements of a database. A search index may enable faster lookup times by linking similar data elements, such as attributes. In some embodiments, apparatus 100 and/or a query may generate an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input attributes and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, a computing device may be configured to generate a web search query based on a freshness and/or age of a query result. A freshness may include an accuracy of a query result. An age may include a metric of how outdated a query result may be. In some embodiments, a computing device may generate a web crawler configured to search the Internet for attributes.

Still referring to FIG. 1, apparatus 100 and/or another device may generate a classifier using a classification algorithm, wherein "classification algorithm" is defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by a computing device may correlate any input data as described in this disclosure to any output data as described in this disclosure. In some embodiments, training data may include index training data. Index training data, defined as training data used to generate an index classifier, may include, without limitation, a plurality of data entries, each data entry including one or more elements of attribute data such as data of technical background, and one or more correlated improvement thresholds, where improvement thresholds and associated attribute data may be identified using feature learning algorithms as described below. Index training data and/or elements thereof may be added to, as a non-limiting example, by classification of multiple users' attribute data to improvement thresholds using one or more classification algorithms.

Still referring to FIG. 1, apparatus 100 may be configured to generate an index classifier using a Naïve Bayes classification algorithm. A Naïve Bayes classification algorithm generates classifiers by assigning class labels to problem instances, represented as vectors of element values. Class labels may be drawn from a finite set. A Naïve Bayes classification algorithm may include generating a family of algorithms that assume that the value of a particular element is independent of the value of any other element, given a class variable. A Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; P(A) is the probability of hypothesis A being true regardless of data also known as prior probability of A; and P(B) is the probability of the data regardless of the hypothesis. A Naïve Bayes algorithm may be generated by first transforming training data into a frequency table. A computing device may then calculate a likelihood table by calculating probabilities of different data entries and classification labels. A computing device may utilize a Naïve Bayes equation to calculate a posterior probability for each class. A class containing the highest posterior probability may be the outcome of prediction. A Naïve Bayes classification algorithm may include a gaussian model that follows a normal distribution. A Naïve Bayes classification algorithm may include a multinomial model that is used for discrete counts. A Naïve Bayes classification algorithm may include a Bernoulli model that may be utilized when vectors are binary.

With continued reference to FIG. 1, apparatus 100 may be configured to generate an index classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating a k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where is $a_i$ number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of attribute data, key words and/or phrases, or the like, to clusters representing themes.

In an embodiment, and still referring to FIG. 1, apparatus 100 may generate a new threshold using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of attribute data, as defined above, with each other. As a non-limiting example, a feature learning algorithm may detect co-occurrences of attribute data, as defined above, with each other. Apparatus 100 may perform a feature learning algorithm by dividing attribute data from a given source into various sub-combinations of such data to create attribute data sets as described above and evaluate which attribute data sets tend to co-occur with which other attribute data sets. In an embodiment, a first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of attribute data with multiple entity skill levels, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, apparatus 100 may generate a k-means clustering algorithm receiving unclassified attribute data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related attribute data, which may be provided with improvement thresholds; this may, for instance, generate an initial set of improvement thresholds from an initial set of attribute data of a large number of users, and may also, upon subsequent iterations, identify new clusters to be provided new improvement threshold to which additional attribute data may be classified, or to which previously used attribute data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\mathrm{argmin}_{c_i} \ni_C \mathrm{dist}(c_i,x)^2$, where argmin includes argument of the minimum, $c_i$ includes a collection of centroids in a set C, and dist includes standard Euclidean distance. K-means clustering module may then recompute centroids by taking mean of all cluster data entries assigned to a centroid's cluster. This may be calculated based on $c_i=1/|S_i|\Sigma_{x_i \ni} S_i^{x_i}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected attribute data set. Degree of similarity index value may indicate how close a particular combination of attribute data is to being classified by k-means algorithm to a particular cluster. K-means clustering algorithm may evaluate the distances of the combination of attribute data levels to the k-number of clusters output by k-means clustering algorithm. Short distances between a set of attribute data and a cluster may indicate a higher degree of similarity between the set of attribute data and a particular cluster. Longer distances between a set of attribute data and a cluster may indicate a lower degree of similarity between an attribute data set and a particular cluster. With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an attribute data set and the data entry cluster. Alternatively or additionally k-means clustering algorithm may select a plurality of clusters having low degree of similarity index values to attribute data sets, indicative of greater degrees of similarity. Degree of similarity index values may be compared to a threshold number indicating a minimal degree of relatedness suitable for inclusion of a set of attribute data in a cluster, where a degree of similarity indices falling under the threshold number may be included as indicative of high degrees of relatedness. Persons skilled in the art, upon reviewing the entirety of this disclosure, will be aware of various additional or alternative feature learning approaches that may be used consistently with this disclosure.

Figure 3:
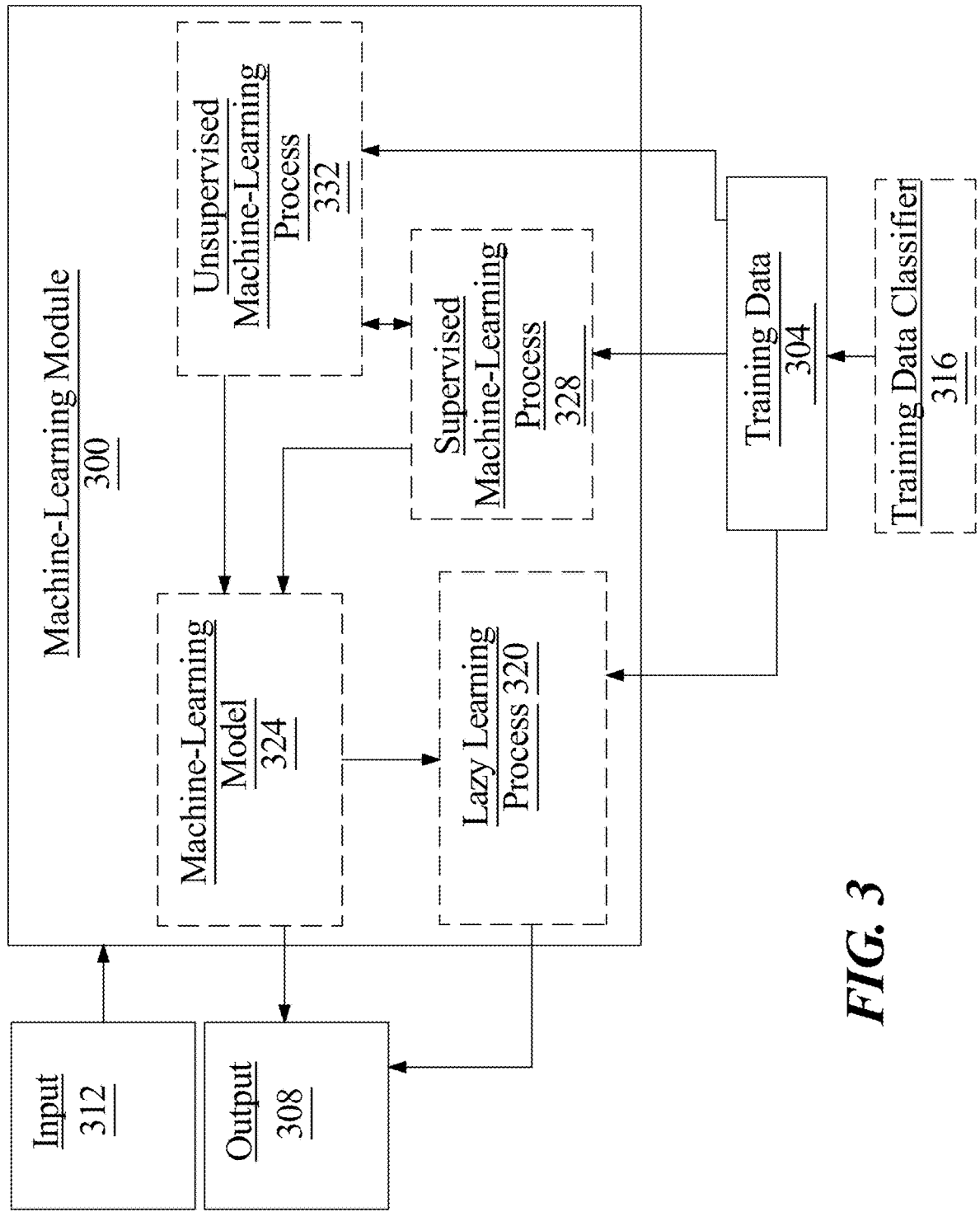
FIG. 3 is a diagram of an exemplary embodiment of a machine-learning module.

Referring now to FIG. 3, a diagram of an exemplary embodiment of a machine-learning module is presented. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
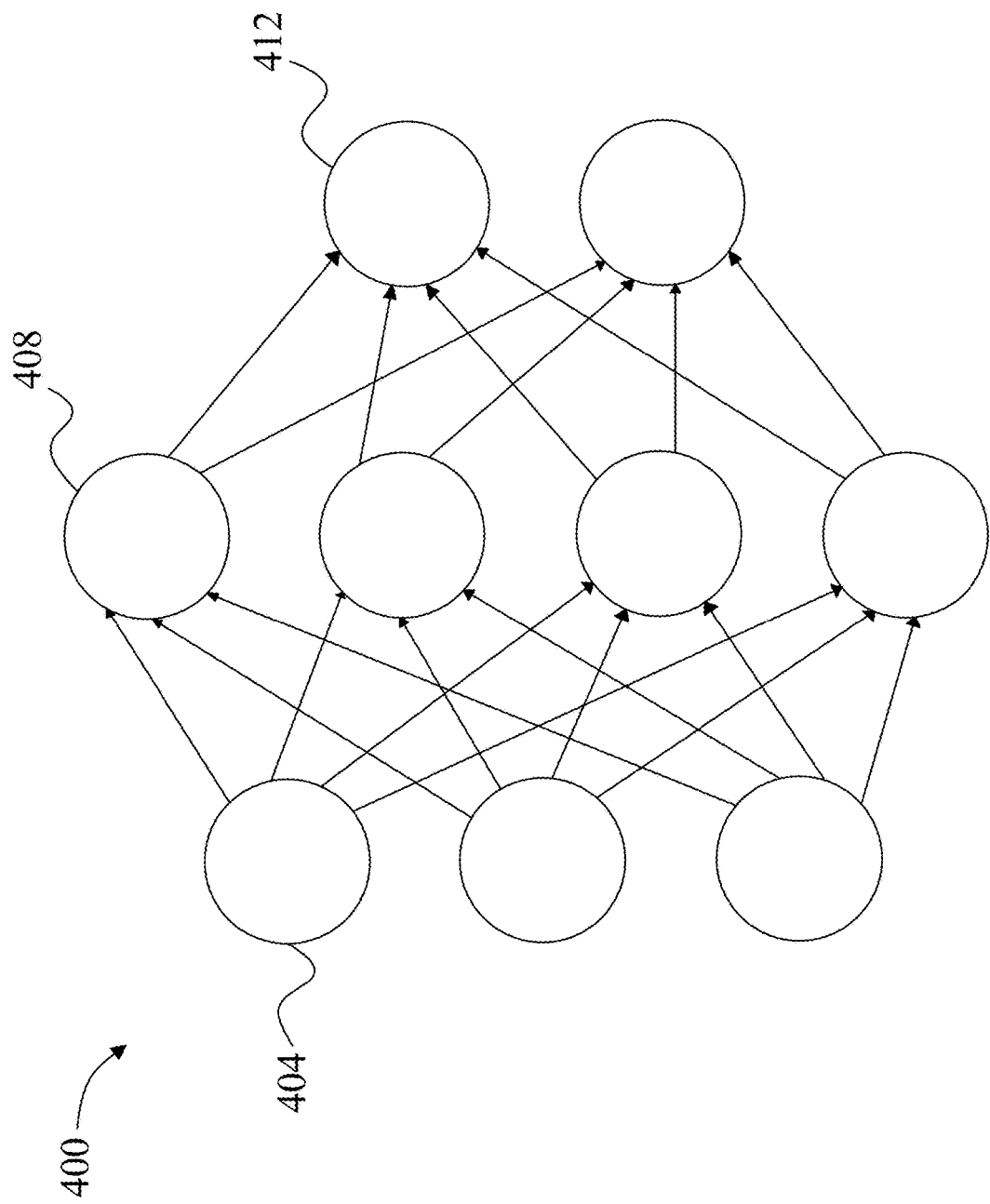
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
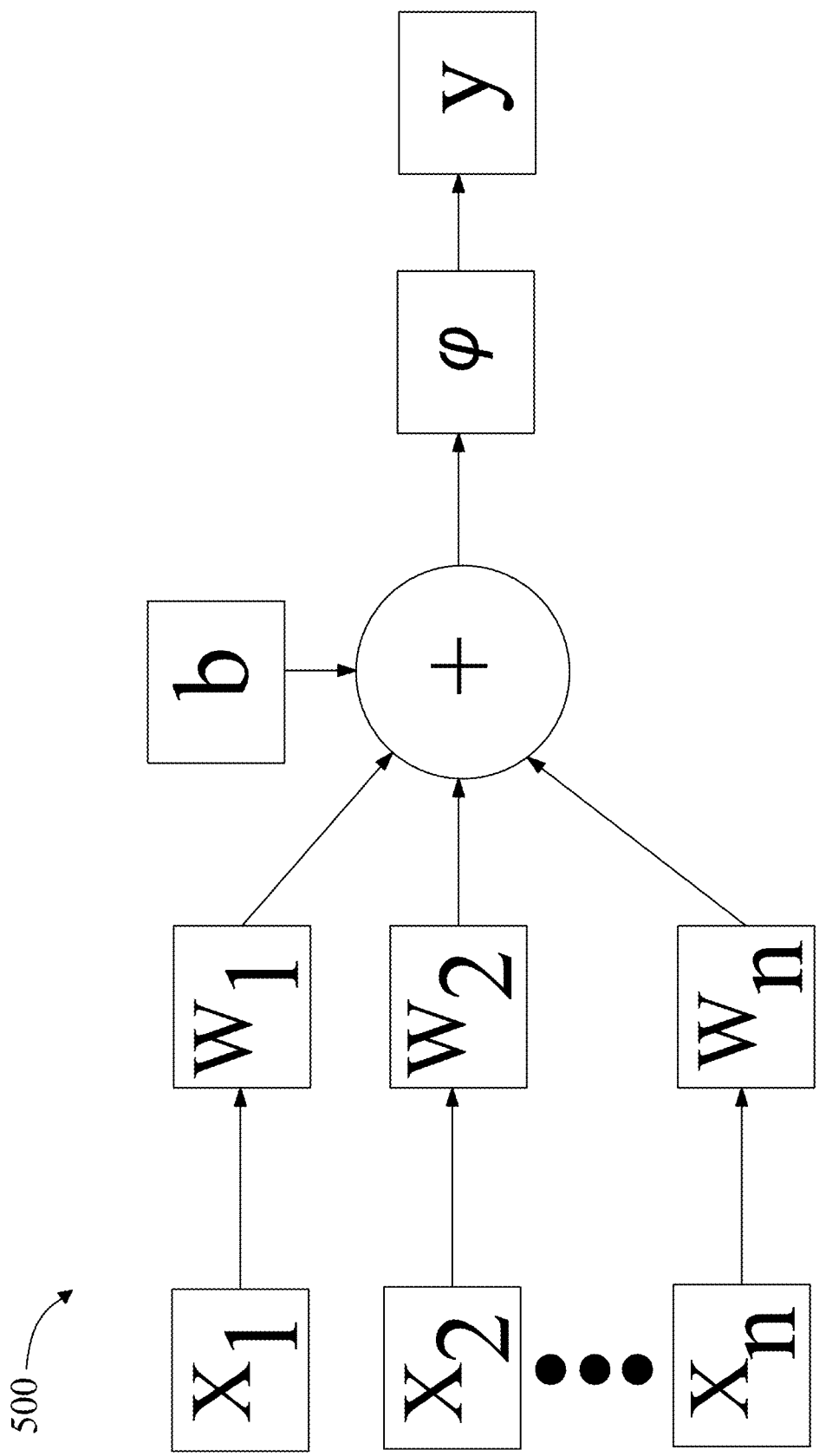
FIG. 5 is a diagram of an exemplary embodiment of a node of a neural network.

Referring now to FIG. 5, an exemplary embodiment 500 of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
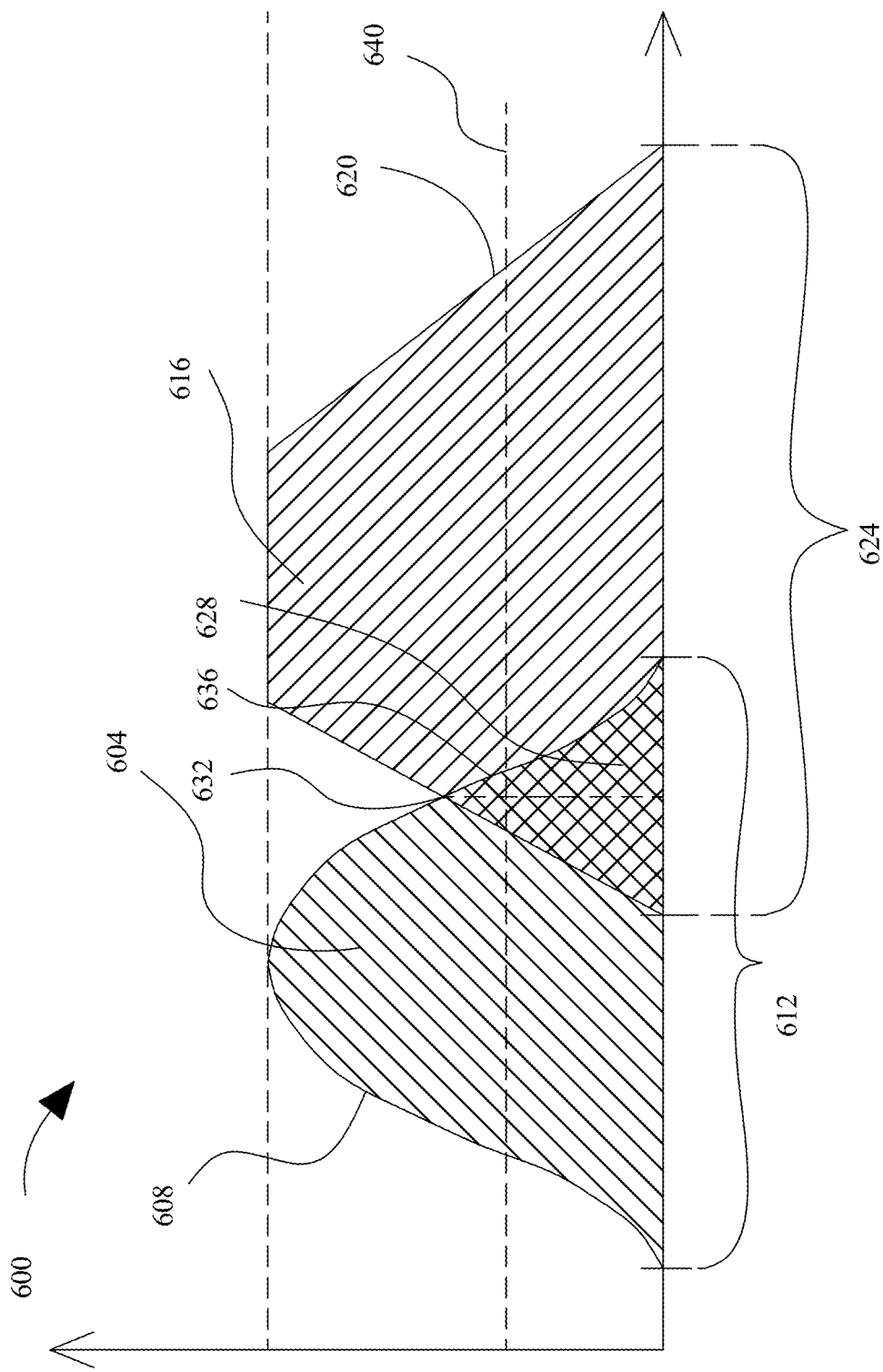
FIG. 6 is a diagram of an exemplary embodiment of a fuzzy set comparison.

Referring to FIG. 6, an exemplary embodiment of fuzzy set comparison 600 is illustrated. This system may be implemented by inputting multiple potentially subjective determinations related to constraints which are represented as fuzzy sets and get output a probability distribution indicating likelihood that the compliance will be under the threshold, a degree to which it is over or under or a yes/no determination. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and a predetermined class, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify a biofeedback signal with a user state. For instance, if a biofeedback signal has a fuzzy set matching a user state fuzzy set by having a degree of overlap exceeding a threshold, computing device 140 may classify the biofeedback signal as belonging to the user state. Where multiple fuzzy matches are performed, degrees of match for each respective fuzzy set may be computed and aggregated through, for instance, addition, averaging, or the like, to determine an overall degree of match.

Still referring to FIG. 6, in an embodiment, a biofeedback signal may be compared to multiple user state fuzzy sets. For instance, biofeedback signal may be represented by a fuzzy set that is compared to each of the multiple user state fuzzy sets; and a degree of overlap exceeding a threshold between the biofeedback signal fuzzy set and any of the multiple user state fuzzy sets may cause computing device 140 to classify the biofeedback signal as belonging to a user state. For instance, in one embodiment there may be two user state fuzzy sets, representing respectively an attentive state and an inattentive state. Attentive state may have an attentive state fuzzy set; inattentive state may have an inattentive state fuzzy set; and biofeedback signal may have a biofeedback fuzzy set. Computing device 140, for example, may compare a biofeedback fuzzy set with each of attentive state fuzzy set and inattentive state fuzzy set, as described above, and classify a biofeedback signal to either, both, or neither of attentive state or inattentive state. Machine-learning methods as described throughout may, in a non-limiting example, generate coefficients used in fuzzy set equations as described above, such as without limitation x, c, and σ of a Gaussian set as described above, as outputs of machine-learning methods. Likewise, biofeedback signal may be used indirectly to determine a fuzzy set, as biofeedback fuzzy set may be derived from outputs of one or more machine-learning models that take the biofeedback signal directly or indirectly as inputs.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
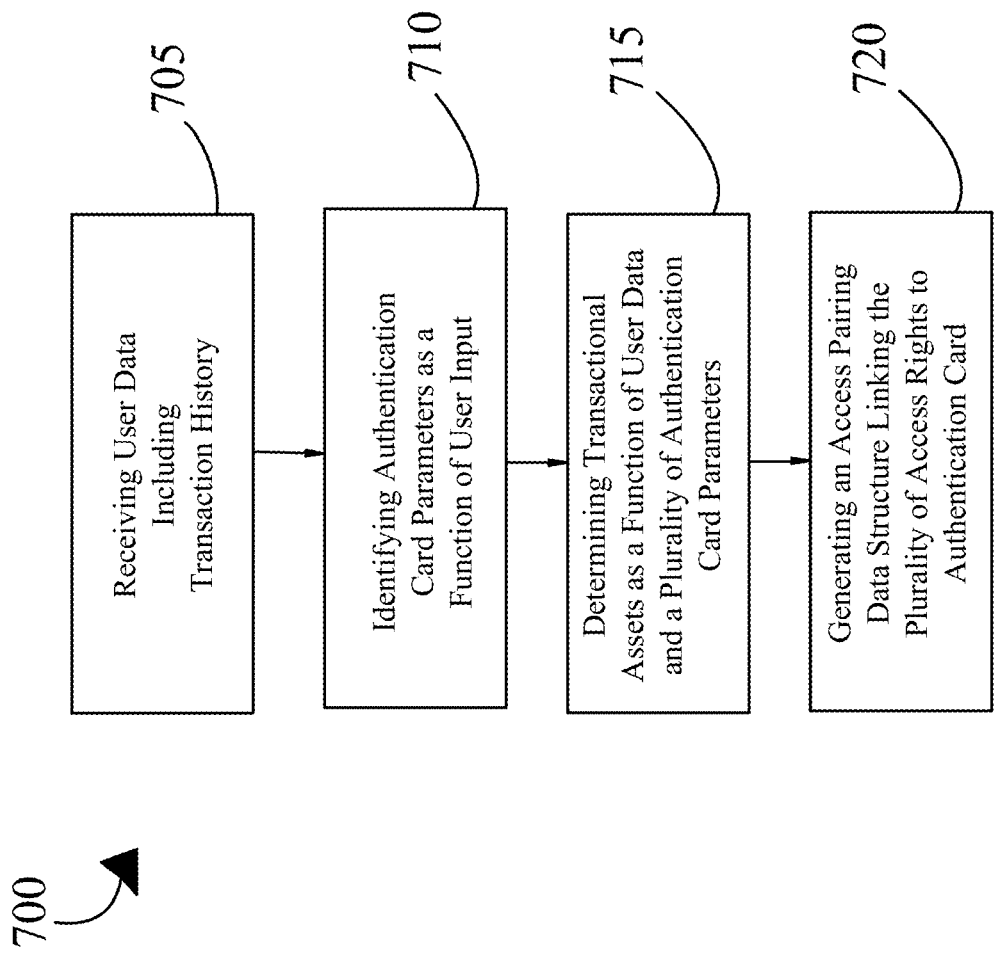
FIG. 7 is a flowchart of a method of a method for classifying a user to a charge card.

Referring now to FIG. 7, a method 700 of using an apparatus for classifying a user to an electronic authentication card 124 in the healthcare field is illustrated. At step 705, method 700 includes receiving user data including transaction history. User data may be received through user input, from external computing devices, such as a remote device, and the like. This step may be implemented as described above in FIGS. 1-6, without limitation.

Still referring to FIG. 7, at step 710, method 700 includes identifying authentication card parameters 128 as a function of user input. This step may be implemented as described above in FIGS. 1-6, without limitation.

Still referring to FIG. 7, at step 715, method 700 includes determining access rights 136 as a function of user data and a plurality of authentication card parameters 128. This step may be implemented as described above in FIGS. 1-6, without limitation.

Still referring to FIG. 7, at step 720, method 700 includes generating an access pairing data structure linking the plurality of access rights to the authentication card 124. This step may be implemented as described above in FIGS. 1-6, without limitation.

Figure 8:
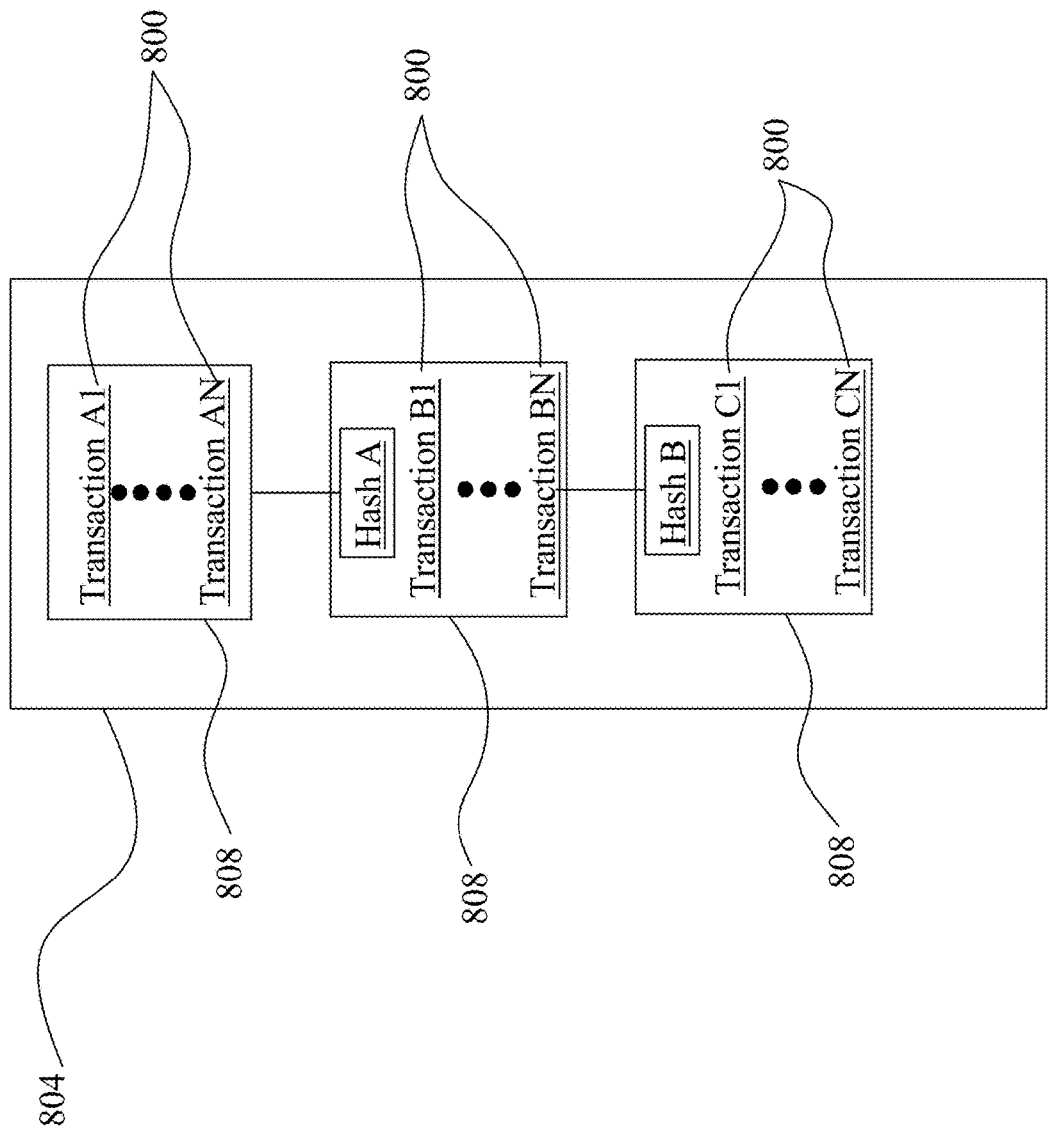
FIG. 8 is a block diagram of an immutable sequential listing.

Referring now to FIG. 8, an exemplary embodiment of an immutable sequential listing is illustrated 800. An immutable sequential listing 800 may be, include and/or implement an immutable ledger, where data entries that have been posted to immutable sequential listing 800 cannot be altered. Data elements are listing in immutable sequential listing 800; data elements may include any form of data, including textual data, image data, encrypted data, cryptographically hashed data, and the like. Data elements may include, without limitation, one or more at least a digitally signed assertions. In one embodiment, a digitally signed assertion 804 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 804. In an embodiment, collection of textual data states that the owner of a certain transferable item represented in a digitally signed assertion 804 register is transferring that item to the owner of an address. A digitally signed assertion 804 may be signed by a digital signature created using the private key associated with the owner's public key, as described above.

Still referring to FIG. 8, a digitally signed assertion 804 may describe a transfer of virtual currency, such as cryptocurrency, as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. A digitally signed assertion 804 may describe the transfer of a physical good; for instance, a digitally signed assertion 804 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 804 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 8, in one embodiment, an address is a textual datum identifying the recipient of virtual currency or another item of value in a digitally signed assertion 804. In some embodiments, address is linked to a public key, the corresponding private key of which is owned by the recipient of a digitally signed assertion 804. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 804 may record a subsequent a digitally signed assertion 804 transferring some or all of the value transferred in the first a digitally signed assertion 804 to a new address in the same manner. A digitally signed assertion 804 may contain textual information that is not a transfer of some item of value in addition to, or as an alternative to, such a transfer. For instance, as described in further detail below, a digitally signed assertion 804 may indicate a confidence level associated with a distributed storage node as described in further detail below.

In an embodiment, and still referring to FIG. 8, immutable sequential listing 800 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 800 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 8, immutable sequential listing 800 may preserve the order in which the at least a posted content took place by listing them in chronological order; alternatively or additionally, immutable sequential listing 800 may organize digitally signed assertions 804 into sub-listings 808 such as "blocks" in a blockchain, which may be themselves collected in a temporally sequential order; digitally signed assertions 804 within a sub-listing 808 may or may not be temporally sequential. The ledger may preserve the order in which at least a posted content took place by listing them in sub-listings 808 and placing the sub-listings 808 in chronological order. Immutable sequential listing 800 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 800 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 8, immutable sequential listing 800, once formed, may be inalterable by any party, no matter what access rights that party possesses. For instance, immutable sequential listing 800 may include a hash chain, in which data is added during a successive hashing process to ensure non-repudiation. Immutable sequential listing 800 may include a block chain. In one embodiment, a block chain is immutable sequential listing 800 that records one or more new at least a posted content in a data item known as a sub-listing 808 or "block." An example of a block chain is the BITCOIN block chain used to record BITCOIN transactions and values. Sub-listings 808 may be created in a way that places the sub-listings 808 in chronological order and link each sub-listing 808 to a previous sub-listing 808 in the chronological order so that any computing device may traverse the sub-listings 808 in reverse chronological order to verify any at least a posted content listed in the block chain. Each new sub-listing 808 may be required to contain a cryptographic hash describing the previous sub-listing 808. In some embodiments, the block chain contains a single first sub-listing 808 sometimes known as a "genesis block."

Still referring to FIG. 8, the creation of a new sub-listing 808 may be computationally expensive; for instance, the creation of a new sub-listing 808 may be designed by a "proof of work" protocol accepted by all participants in forming immutable sequential listing 800 to take a powerful set of computing devices a certain period of time to produce. Where one sub-listing 808 takes less time for a given set of computing devices to produce the sub-listing 808 protocol may adjust the algorithm to produce the next sub-listing 808 so that it will require more steps; where one sub-listing 808 takes more time for a given set of computing devices to produce the sub-listing 808 protocol may adjust the algorithm to produce the next sub-listing 808 so that it will require fewer steps. As an example, protocol may require a new sub-listing 808 to contain a cryptographic hash describing its contents; the cryptographic hash may be required to satisfy a mathematical condition, achieved by having the sub-listing 808 contain a number, called a nonce, whose value is determined after the fact by the discovery of the hash that satisfies the mathematical condition. Continuing the example, the protocol may be able to adjust the mathematical condition so that the discovery of the hash describing a sub-listing 808 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 808 according to the protocol is known as "mining." The creation of a new sub-listing 808 may be designed by a "proof of stake" protocol as will be apparent to those skilled in the art upon reviewing the entirety of this disclosure.

Continuing to refer to FIG. 8, in some embodiments, protocol also creates an incentive to mine new sub-listings 808. The incentive may be financial; for instance, successfully mining a new sub-listing 808 may result in the person or entity that mines the sub-listing 808 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 808. Each sub-listing 808 created in immutable sequential listing 800 may contain a record or at least a posted content describing one or more addresses that receive an incentive, such as virtual currency, as the result of successfully mining the sub-listing 808.

With continued reference to FIG. 8, where two entities simultaneously create new sub-listings 808, immutable sequential listing 800 may develop a fork; protocol may determine which of the two alternate branches in the fork is the valid new portion of the immutable sequential listing 800 by evaluating, after a certain amount of time has passed, which branch is longer. "Length" may be measured according to the number of sub-listings 808 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 808 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 800 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 800.

Still referring to FIG. 8, additional data linked to at least a posted content may be incorporated in sub-listings 808 in immutable sequential listing 800; for instance, data may be incorporated in one or more fields recognized by block chain protocols that permit a person or computer forming a at least a posted content to insert additional data in immutable sequential listing 800. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 8, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 808 in a block chain computationally challenging; the incentive for producing sub-listings 808 may include the grant of new crypto-currency to the miners. Quantities of crypto-currency may be exchanged using at least a posted content as described above.

Figure 9:
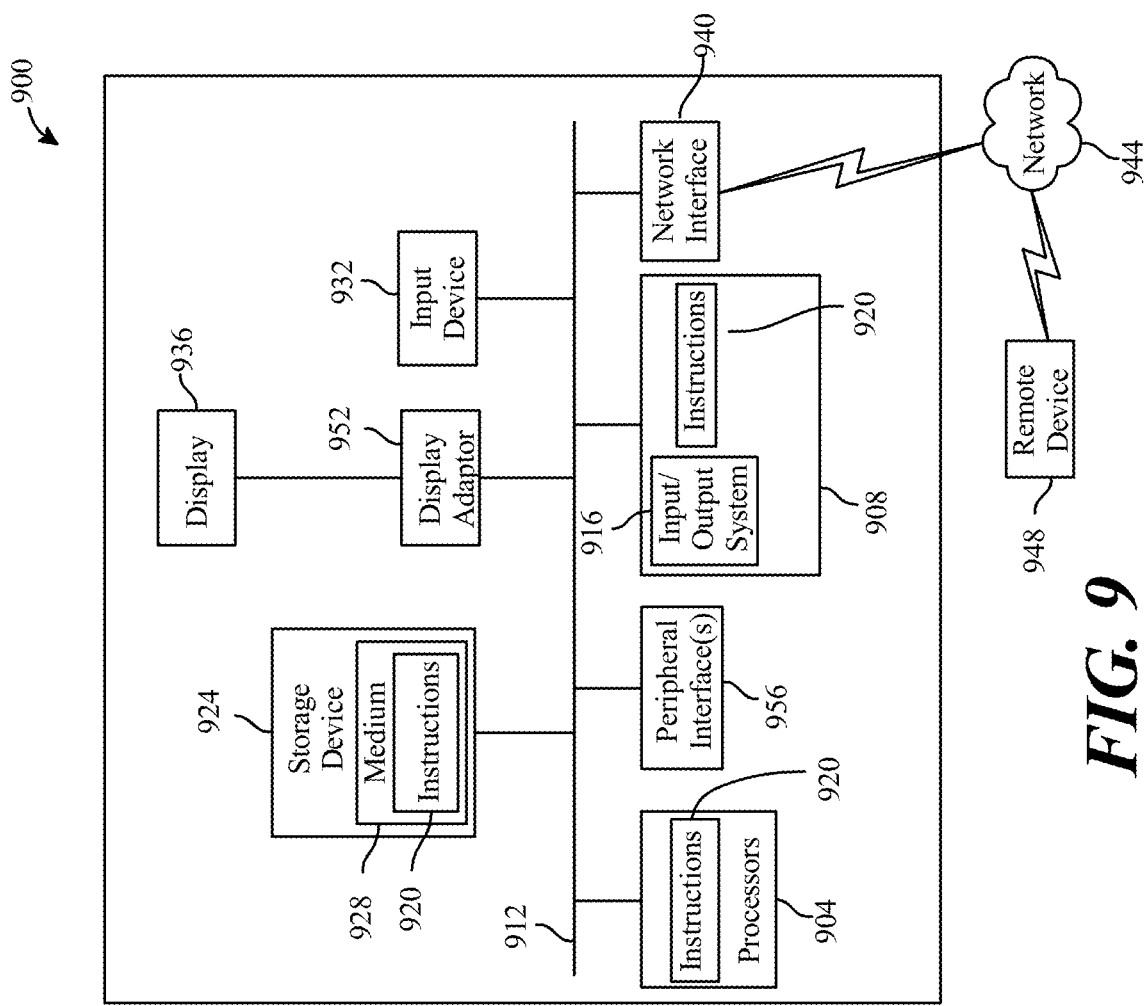
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components hereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for classifying a user to an electronic authentication card, the apparatus comprising:
   at least a processor; and
   a memory communicatively connected to the processor, the memory containing instructions configuring the at least a processor to:
   receive user data comprising a transaction history;
   identify a plurality of authentication card parameters as a function of user input, wherein identifying the plurality of authentication card parameters comprises generating an activity threshold parameter using a feature learning algorithm;
   determine a plurality of access rights as a function of user data and the plurality of authentication card parameters, wherein determining the plurality of access rights includes:
   utilizing a machine-learning model, wherein generating the machine-learning model comprises:
   receiving training data, wherein the training data comprises user data and authentication card parameter inputs and the plurality of access rights outputs;
   training the machine-learning model as a function of the training data;
   determining, by the machine learning model, as a function of the user data and authentication card parameters, the access rights;
   receiving updated user data; and
   determining an updated plurality of access rights as a function of the machine learning model and the updated user data; and
   determining a score based on a minimized objective function; and
   generate an access pairing data structure linking the plurality of access rights to the authentication card.

2. The apparatus of claim 1, wherein the user data comprises occupation information.

3. The apparatus of claim 1, wherein the access pairing data structure further comprises a cryptographically signed data element.

4. The apparatus of claim 1, wherein the access pairing data structure is immutable.

5. The apparatus of claim 1, wherein the transaction history comprises at least a cryptographically signed data element and at least an immutable element.

6. The apparatus of claim 1, wherein receiving the user data comprises receiving a user input from a graphical user interface.

7. The apparatus of claim 1, wherein the plurality of authentication card parameters comprises an activity threshold parameter.

8. The apparatus of claim 1, wherein the plurality of access rights comprises at least an aesthetic specific access right.

9. The apparatus of claim 1, further configured to display the access rights on the graphical user interface.

10. A method for classifying a user to an electronic authentication card, the method comprising:
- receiving, by the at least a processor, user data including transaction history;
- identifying, by the at least a processor, a plurality of authentication card parameters as a function of user input, wherein identifying the plurality of authentication card parameters comprises generating an activity threshold parameter using a feature learning algorithm;
- determining a plurality of access rights as a function of user data and the plurality of authentication card parameters, wherein determining the plurality of access rights includes:
  - utilizing a machine-learning model, wherein generating the machine-learning model comprises:
    - receiving training data, wherein the training data comprises user data and authentication card parameter inputs and the plurality of access rights outputs;
    - training the machine-learning model as a function of the training data;
    - determining, by the machine learning model, as a function of the user data and authentication card parameters, the access rights; and
    - receiving updated user data; and
    - determining an updated plurality of access rights as a function of the machine learning model and the updated user data; and
  - determining a score based on a minimized objective function; and
- generating an access pairing data structure linking the plurality of access rights to the authentication card.

11. The method of claim 10, wherein the user data comprises occupation information.

12. The method of claim 10, wherein the access pairing data structure further comprises a cryptographically signed data element.

13. method of claim 10, wherein the access pairing data structure is immutable.

14. The method of claim 10, wherein the transaction history comprises at least a cryptographically signed data element and an immutable element.

15. The method of claim 10, wherein receiving the user data comprises receiving a user input from a graphical user interface.

16. The method of claim 10, wherein the plurality of authentication card parameters comprises an activity threshold parameter.

17. The method of claim 10, wherein the plurality of access rights comprises at least an aesthetic specific access right.

18. The method of claim 10, further configured to display the access rights on the graphical user interface.

* * * * *